United States Patent [19]

Davis et al.

[11] 4,123,581

[45] Oct. 31, 1978

[54] SELF-ADHERING STENCIL

[75] Inventors: Abraham D. Davis, Dolton; Kenneth W. Pinter, Mundelein, both of Ill.

[73] Assignee: A. B. Dick Company, Niles, Ill.

[21] Appl. No.: 742,903

[22] Filed: Nov. 18, 1976

[51] Int. Cl.² ........................ B32B 5/18; B32B 29/00; B41N 1/24

[52] U.S. Cl. ................................ 428/318; 101/128.2; 428/347; 428/349; 428/354; 428/511; 428/535

[58] Field of Search ............... 428/195, 200, 261, 318, 428/320, 511, 512, 542, 347, 349, 248, 346, 354, 343; 101/128.2; 118/504, 505; 427/259, 272, 282

[56] References Cited

U.S. PATENT DOCUMENTS

| | | | |
|---|---|---|---|
| 2,693,426 | 11/1954 | Hoover et al. | 428/318 X |
| 3,595,166 | 7/1971 | Sherman | 428/511 X |
| 3,595,739 | 7/1971 | Meyer | 428/349 X |
| 3,619,345 | 11/1971 | Kubo et al. | 101/128.2 |
| 3,620,160 | 11/1971 | Kubo et al. | 428/318 X |
| 3,682,763 | 8/1972 | Kubo et al. | 428/320 X |
| 3,715,267 | 2/1973 | Kubo et al. | 101/128.2 |
| 3,745,059 | 7/1973 | Kubo et al. | 101/128.2 |
| 3,824,117 | 7/1974 | Anderson et al. | 428/511 X |
| 3,871,899 | 3/1975 | Anderson | 101/128.2 X |
| 3,920,499 | 11/1975 | Day et al. | 428/200 X |

*Primary Examiner*—George F. Lesmes
*Assistant Examiner*—R. Eugene Varndell, Jr.
*Attorney, Agent, or Firm*—McDougall, Hersh & Scott

[57] ABSTRACT

A self-adhering stencil in which a heat sensitive bonding resin is disposed as a coating on the uncoated tissue or incorporated in the stencil layer or disposed as a coating on either or both sides of the stencil layer.

1 Claim, 5 Drawing Figures

SELF-ADHERING STENCIL

This invention relates to a self-adhering stencil which can be bonded at any portion and in any desirable pattern to a substrate, such as a backing sheet, stencil frame, business form, or the like, without the need to add any adhesive, tape, or other fastening means.

The use of separate adhesive or tape applied to specific areas of a stencil in order to enable attachment of the stencil to a backing sheet, frame, business form or other substrate, finds widespread objection. For example, adhesives in liquid form, or in solid form for application as a hot melt, require special formulation for interbonding two radically different surfaces. It requires special metering equipment for application of the correct amount of adhesive in a desired pattern. Liquid adhesives spread beyond the areas of initial application before drying is completed, thereby causing undesirable sticking in portions not desired to be adhered. Upon separation of the stencil from the substrate, an undesirable broad area with erratic edges, composed of adhesive and coating, remains on the substrate — a situation that detracts from the use of the stencil, especially when the substrate is a business form. Another disadvantage in the use of a liquid adhesive is to be found in the limitation imposed on the speed of collating machines by reason of the slow drying of the adhesive. Aside from the above, use of an adhesive or tape requires the supply of material and means for application which otherwise would not be required to be available with a self-adhering stencil.

Tapes require special formulation and means for dispensing and application. Loss of plasticizer from the tapes often renders the tape unfit for use or results in loss of adhesiveness from tapes that have been applied. Migration of plasticizer from the stencil to the tape often results in softening the tape and the development of stickiness which often causes the stencil assembly undesirably to stick to adjacent assemblies with which it is packaged or to other papers or substrates which come into contact with the stencil sheet assembly.

Thus it is an object of this invention to produce and to provide a method for producing a self-adhering stencil which does not require the application of an adhesive or tape for attachment of the stencil to a desirable substrate, said stencil can be caused to adhere to a substrate in any selected area or pattern, in which the bond between the stencil and the substrate is retained over extended periods of time and under widely diverse atmospheric conditions without loss of adhesiveness and without development of undesirable stickiness, in which the interbonded relationship between the stencil and substrate can be effected in a fraction of the time otherwise required for drying of an applied liquid adhesive and in which the interbonded relationship between the self-adhering stencil and substrate can be effected with readily available equipment that can be applied in an efficient and economical manner.

These and other objects and advantages of this invention will hereinafter appear and for purposes of illustration, but not of limitation, embodiments of the invention are shown in the accompanying drawing in which —

The invention has application to the construction of stencils of the various types including mechanical stencils in which the stencil openings are formed in response to the displacement of the ink impervious stencil coating by the application of pressure from a typewriter key, stylus or die. In the case of a mechanical stencil, the stencilizable coating is formed by one or more coatings applied to one or both sides of a porous stencil base tissue formed of long fibers, such as abaca or yoshino fibers, or fibers of the type used in making tea bags, such as marketed by the Dexter Paper Company. For illustration of the structure and composition of the various types of stencils, reference may be made to U.S. Pat. No. 2,693,426 for mechanical stencils.

In accordance with the practice of this invention, a heat sensitive adhesive bonding material is embodied as a component of the stencil coating applied to the stencil base tissue or as a separate layer applied to one side or the other of the stencilizable layer, or as a coating applied to a stencil base tissue.

Figure 2:
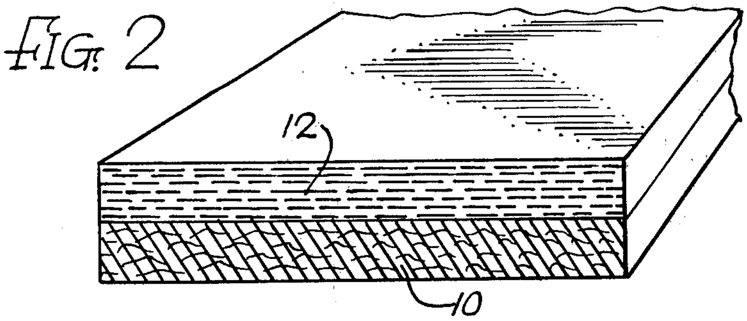
FIG. 2 is a view similar to that of FIG. 1 showing a modification in the construction of the stencil.

In accordance with the modification shown in FIG. 2, the heat sensitive material would be incorporated directly to form a component of the conventional stencil solution to form the stencil coating 12 onto a stencil base tissue 10. In other modifications, the heat sensitive material is formulated into a separate coating composition which can be applied to the stencil base tissue 10 to provide a coating 14 before application of the conventional stencil coating composition to form the stencilizable layer 16, or which can be applied to form a coating 18 and/or coating 22 after the stencil coating composition has been applied to the base tissue 10 to form the stencil coating 20.

Figure 1:
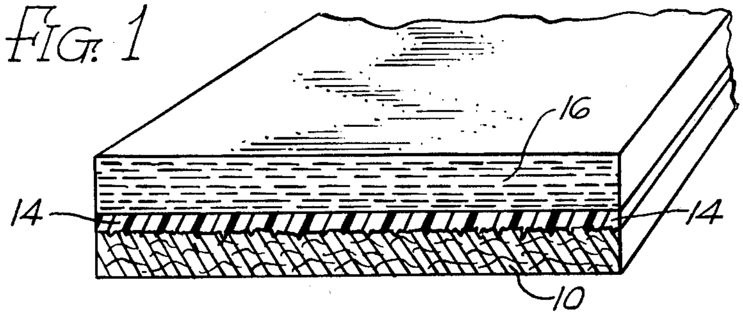
FIG. 1 is a perspective view showing a section of a stencil embodying the features of this invention.

In the event that the heat sensitive material is applied as a coating separate and apart from the stencil coating composition, as in the modification illustrated in FIG. 1, the heat sensitive material remains as a coating 14 on top of and at least partially embedded into the interstices between the fibers of the porous stencil base tissue 10. When use is made of a heat sensitive material of the type which forms a continuous film in the layer 14, covering the stencil base tissue, then the layer of heat sensitive material must be capable of stencilization simultaneously with the stencilization of the stencil coating 16. In the absence of stencilization of the heat sensitive layer 14, precautions must be taken to avoid the formation of an impervious film or layer, as by use of the heat sensitive material in a concentration in the coating composition low enough merely to coat or impregnate the fibers of the base tissue, without filling the voids between the fibers, so as to enable the flow of ink composition through the stencil openings in an amount and rate to produce copy of good quality. When applied as a separate coating on top of the stencil layer, the amount of heat sensitive material applied should be so small as not to interfere with stencilization or else it should be capable of stencilization along with the stencil coating.

The concentration of heat sensitive material in the coating composition will depend somewhat upon the film forming and adhesive characteristics of the heat sensitive material, its melt viscosity and the manner in which it is incorporated into the stencil sheet. When the heat sensitive material is embodied in the coating composition or as a coating separate and apart from the stencil coating as on the stencil base tissue or on either side of the layer of stencilizable material, the heat sensitive material should be applied in an amount sufficient to yield a minimum adhesive bond strength of 2 grams/linear inch between the coated stencil and the substrate to which it is being adhered by application of heat. The bond strength should be a measurement of peel strength measured with a tensile tester having a jaw separation rate of 12 inches/minute. When applied directly to the stencil base sheet in advance of the stencil coating, and in order to avoid the formation of a blocking layer across the stencil base tissue, it is desirable to make use of a coating composition in which the heat sensitive material is present in low concentration so as to provide for impregnation of the fabric and coating of the fibers without filling the interstices thereof. For this purpose, it is sufficient if the amount of heat sensitive material in the coating composition is as low as 2% by weight. The amount applied will be somewhat the same as described above.

Representative of the heat sensitive materials which may be used are the polyamide resins, polyester resins and ketone based resins, acrylic acid esters, the alkyl acrylic acid esters, polyvinyl acetate, and the like.

Having described the basic concepts of this invention, illustration will now be made by way of the following examples, which are given by way of illustration but not by way of limitation.

The following is an example of a composition for direct application of the heat sensitive material onto the stencil base tissue to form coating 14:

EXAMPLE 1

2.0% by weight polyurethane resin (Estane 5167 — B. F. Goodrich Chemical Co.)
98.0% by weight methyl ethyl ketone The materials were mixed on a roller mill until the Estane was taken into solution. The solution was coated onto a stencil base tissue by means of a roll coater and then dried with hot forced air.

The Estane coating was overcoated with a conventional stencil coating composition, as described in U.S. Pat. No. 2,693,426, after which the stencil coating was oven dried.

The following are examples of compositions for incorporating the heat sensitive material into a conventional stencil coating composition:

EXAMPLE 2

12.0% by weight polyamide resin (Polymid 1144 — Lawter Chemicals, Inc.)
27.0% by weight isopropyl alcohol
61.0% by weight diethyl ether The above materials were mixed on a roller mill until the resin was taken into solution. The solution was incorporated into a stencil solution such as described in U.S. Pat. No. 2,693,426, in an amount to represent 2–10% by weight of the solids thereof. The final solution was coated onto a conventional stencil base tissue and were dried with forced hot air.

EXAMPLE 3

35.0% by weight polyamide resin (Polymid 1144 — Lawter Chemicals, Inc.)
65.0% wy weight isopropyl alcohol

EXAMPLE 4

15.0% by weight ethyl methacrylate (Elvacite 2043 — E. I. Du Pont)
85.0% by weight ethyl alcohol

EXAMPLE 5

35.0% by weight polyester resin (K-1979 — Lawter Chemicals, Inc.)
65.0% by weight acetone

EXAMPLE 6

35.0% by weight ketone based resin (K-1717 — Lawter Chemicals, Inc.)
65.0% by weight acetone

EXAMPLE 7

10.0% by weight acrylic resin (Carboset 525 — B. F. Goodrich Chemical Co.)
90.0% by weight ethyl alcohol

EXAMPLE 8

25.0% by weight vinyl butyral resin (XYLS-2 — Union Carbide Co.)
75.0% by weight ethyl alcohol

EXAMPLE 9

30.0% by weight polyvinyl acetate resin (Gelva V-55-E-24 — Monsanto Chemical Co.)
70.0% by weight ethyl alcohol The above were formed into solutions as in Example 1 and coated onto a stencil base tissue by means of a roll coater and dried with hot forced air, in the manner of Example 1.

Figure 3:
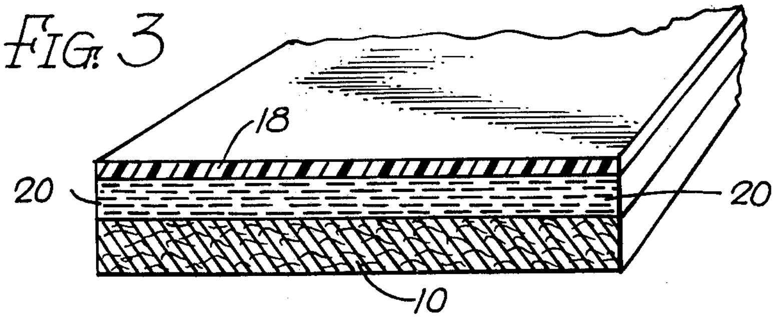
FIG. 3 is a view similar to those of FIGS. 1 and 2 showing a further modification in the stencil.
Figure 4:
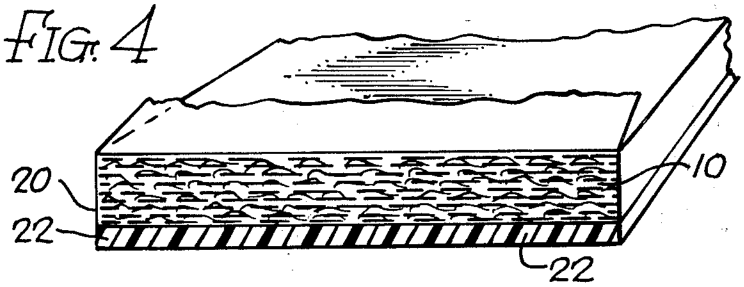
FIG. 4 is a view similar to those of FIGS. 1, 2 and 3, showing a stencil embodying the features of this invention.
Figure 5:
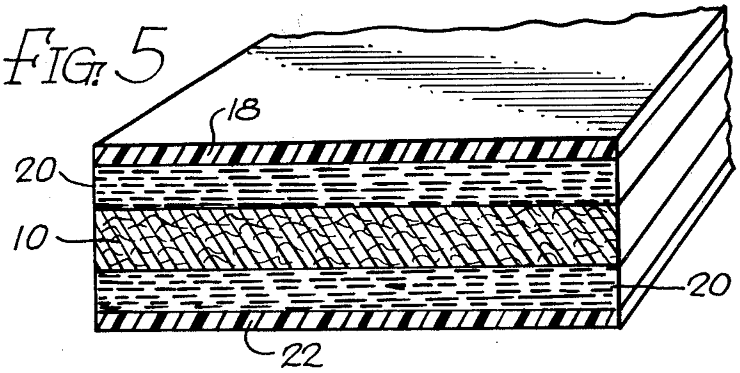
FIG. 5 is a view showing a stencil coated on both sides.

The following are examples of compositions for coating on one side of a conventional stencil coating or onto both sides of a conventional stencil coating, as represented by the coatings 18 and 22 in FIGS. 3, 4 and 5.

EXAMPLE 10

22.5% by weight methyl ethyl ketone
2.5% by weight polyurethane resin (Estane 5716 — B. F. Goodrich Chemical Co.)
75.0% by weight toluene The methyl ethyl ketone and polyurethane resin are mixed on a roller mill until the resin is taken into solution. The toluene was added and the resulting solution was coated onto a coated stencil followed by oven drying with forced hot air. For application as a top coat onto the stencil coating, it is sufficient if the heat sensitive material is applied in an amount to yield a minimum adhesive bond strength of 2 grams/linear inch between the coated stencil and the substrate to which it is being adhered by application of heat, as previously described.

EXAMPLE 11

10.0% by weight polyurethane resin (Estane 5715 — B. F. Goodrich Chemical Co.)
90.0% by weight tetrahydrofuran

EXAMPLE 12

15.0% by weight ethyl methacrylate (Elvacite 2043 — E. I. DuPont)
85.0% by weight ethyl alcohol

EXAMPLE 13

35.0% by weight polyester resin (K-1979 — Lawter Chemicals, Inc.)
65.0% by weight acetone The compositions of Examples 11–13 are processed and coated onto the coated stencil as in Example 10.

In use, the self-adhering stencil, embodying the features of this invention, can be bonded to the desired substrate, be it a backing sheet, a stencil frame, a business form, or the like, by superposing the stencil onto the substrate or vice versa, and then applying heat and pressure to the selected areas to be adhered and for a time sufficient to reduce the heat sensitive material to an adhesive state whereby the desired bonded relationship is established between the stencil and the substrate. For example, the self-adhered stencil of the examples can be adhered with a "Hand-I-Seal" hand iron onto bond paper to form a stencil sheet assembly which can be stencilized in a conventional manner by stylus, pressure die, or typewriter, to form the desired stencil openings.

In the instance when the substrate is a business form, after the stencil has been stencilized with the desired information, with which the business form is involved, the adhered stencil can be removed from the form for use to apply a label onto a shipping carton or cartons.

In the event that the substrate represents a stencil backing sheet, the stencil remains adhered to the stub of the formed stencil sheet assembly and is used in the conventional manner in a stencil duplicating machine in the preparation of multiple copies.

We claim:

1. A self-adhering stencil comprising a porous stencil base tissue, a stencilizable layer present as a coating on the stencil base tissue and a heat sensitive adhesive material present as an outer layer on the stencilizable layer in an amount sufficient to yield a heat bond of minimum peel strength for bonding the stencil to a separate substrate.

* * * * *